United States Patent
Kim

(10) Patent No.: US 7,688,800 B2
(45) Date of Patent: Mar. 30, 2010

(54) DIGITAL BROADCAST RECEIVER AND DIRECTED CHANNEL CHANGE METHOD THEREOF

(75) Inventor: Young-kee Kim, Bucheon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 820 days.

(21) Appl. No.: 11/453,967

(22) Filed: Jun. 16, 2006

(65) Prior Publication Data

US 2007/0147235 A1    Jun. 28, 2007

(30) Foreign Application Priority Data

Jul. 15, 2005    (KR) .................. 10-2005-0064370

(51) Int. Cl.
H04B 7/212    (2006.01)
(52) U.S. Cl. .................. 370/347; 370/486
(58) Field of Classification Search .......... None
See application file for complete search history.

(56) References Cited

U.S. PATENT DOCUMENTS

2003/0197732 A1*  10/2003  Gupta ................ 345/764
2004/0017831 A1*  1/2004   Shen et al. ............ 370/486

FOREIGN PATENT DOCUMENTS

| JP | 2000-341596 A | 12/2000 |
| KR | 10-2001-0028526 A | 4/2001 |
| KR | 10-2002-0077631 A | 10/2002 |
| KR | 10-2003-0045991 A | 6/2003 |
| KR | 10-2004-0017592 A | 2/2004 |
| KR | 2005-0044063 A | 12/2005 |

* cited by examiner

*Primary Examiner*—Erika A Gary
(74) *Attorney, Agent, or Firm*—Sughrue Mion, PLLC

(57) ABSTRACT

An apparatus and method for changing a channel according to direct channel change information transmitted from a broadcasting station. The apparatus includes a broadcast receiver, a tuner and a controller for checking parsed DCC information. The broadcast receiver receives a broadcast signal. The tuner tunes channels and stores the tuned channels in memory. The controller parses DCC information received in the broadcast signal and checks for a target channel included in the DCC information. The controller then changes a channel by selecting one among plural virtual channels according to a predetermined priority when several virtual channels correspond to the target channel.

10 Claims, 3 Drawing Sheets

FIG. 2

| Syntax | Bits | Format |
|---|---|---|
| directed_channel_change_section() { | | |
| table_id | 8 | 0xD3 |
| section_syntax_indicator | 1 | '1' |
| private_indicator | 1 | '1' |
| reserved | 2 | '11' |
| section_length | 12 | uimsbf |
| dcc_subtype | 8 | 0x00 |
| dcc_id | 8 | uimsbf |
| reserved | 2 | '11' |
| version_number | 5 | uimsbf |
| cument_next_indicator | 1 | bslbf |
| section_number | 8 | uimsbf |
| last_section_number | 8 | uimsbf |
| protocol_version | 8 | uimsbf |
| dcc_test_count | 8 | uimsbf |
| for(i=0; i<dcc_test_count; i++) { | | |
|     dcc_context | 1 | uimsbf |
|     reserved | 3 | '111' |
|     dcc_from_major_channel_number | 10 | uimsbf |
|     dcc_from_minor_channel_number | 10 | uimsbf |
|     reserved | 4 | '1111' |
|     dcc_to_major_channel_number | 10 | uimsbf |
|     dcc_to_minor_channel_number | 10 | uimsbf |
|     dcc_start_time | 32 | uimsbf |
|     dcc_end_time | 32 | uimsbf |
|     dcc_term_count | 8 | uimsbf |
|     for(j=0; j<dcc_term_count; j++) { | | |
|         dcc_selection_type | 8 | uimsbf |
|         dcc_selection_id | 64 | uimsbf |
|         reserved | 6 | '111111' |
|         dcc_term_descriptors_length | 10 | uimsbf |
|         for(k=0; k<N; k++) { | | |
|             dcc-test-descriptor() | | |
|         } | | |
|     } | | |
|     reserved | 6 | '111111' |
|     dcc_test_descriptors_length | 10 | uimsbf |
|     for(j=0; j<N; j++) { | | |
|         dcc_test_descriptor() | | |
|     } | | |
| } | | |
| reserved | 6 | '111111' |
| dcc_sdditional_descriptor_length | 10 | uimsbf |
| for(i=0; i<N; i++) { | | |
|     dcc_additional_descriptor() | | |
| } | | |
| CRC_32 | 32 | rpchof |
| } | | |

DIGITAL BROADCAST RECEIVER AND DIRECTED CHANNEL CHANGE METHOD THEREOF

CROSS-REFERENCE TO RELATED APPLICATIONS

This application claims the benefit of Korean Patent Application No. 2005-0064370, filed on Jul. 15, 2005, in the Korean Intellectual Property Office, the disclosure of which is incorporated herein by reference.

BACKGROUND OF THE INVENTION

1. Field of the Invention

The present invention relates to a digital broadcast receiver and a directed channel change method thereof, in which a channel is changed according to directed channel change information transmitted from a broadcasting station.

2. Description of the Related Art

Digital broadcasting has recently begun. In digital broadcasting as compared with analog broadcasting, a video signal and an audio signal are converted into digital signals, and then the digital signal is compressed, packeted and transmitted as a transport stream.

Digital broadcasting standards are selected to be adapted to a variety of countries, respectively. A directed channel change table (DCCT) has been proposed as an extended standard of the program and system information protocol (PSIP) of the advanced television systems committee (ATSC) standard selected in North America. Further, there are similar standards for another digital broadcasting selected in Europe or other countries.

Here, the DCCT is a table, having information about how to automatically change a channel under certain conditions, which is transmitted in the PSIP. According to the DCCT, items taken as channel change conditions are tabulated by codes. For example, the item includes local information, population information, genre information, etc. Further, setting information corresponding to such items is set in a broadcast receiver by a user.

When a digital broadcast receiver receives DCCT information, the received DCCT information is compared with the previously set information related to the DCCT. In the case where the received DCCT information is equal to the previously set information related to the DCCT, the channel is changed according to the DCCT information. Then, when a program of the changed channel is finished, the channel returns to an original channel.

However, a plurality of virtual channels may be allocated to one channel number according to local characteristics. For example, in the case of an area located between Seoul and Daejeon in Korea, two channels corresponding to Seoul and Daejeon broadcasting stations may be allocated to one channel number of 11-1. Currently, the ATSC standard has no proposal to solve a problem of channel duplication.

Therefore, in this case, the digital television or a set-top box should select and change one of a plurality of duplicated channels to perform a directed channel change (DCC) function.

SUMMARY OF THE INVENTION

Accordingly, it is an aspect of the present invention to provide a digital broadcast receiver and a directed channel change method thereof, in which one of duplicated channels is automatically selected on a DCC function when a target channel duplicates.

The foregoing and/or other aspects of the present invention can be achieved by providing a directed channel change method for a digital broadcast receiver on the basis of directed channel change (DCC) information, the method comprising receiving the DCC information from a broadcasting station; parsing the DCC information; checking a target channel included in the DCC information; and changing a channel by selecting one among plural virtual channels according to predetermined priority when the plural virtual channels correspond to the target channel.

According to another aspect of the present invention, changing the channel comprises determining whether the target channel is included in a currently receiving transform stream, and changing the channel into a channel included in the currently receiving transform stream among the plural target channels when the target channel is included in the currently receiving transform stream.

According to another aspect of the present invention, changing the channel comprises changing the channel according to predetermined priority when plural virtual channels corresponding to the target channel are not included in the currently receiving transform stream.

According to another aspect of the present invention, the DCC information is tabulated as a direct channel change table (DCCT).

The foregoing and/or other aspects of the present invention can be achieved by providing a directed channel change method for a digital broadcast receiver on the basis of DCC information, the method comprising storing a tuned channel; receiving the DCC information from a broadcasting station; parsing the DCC information; checking a target channel included in the DCC information; and changing a channel into the target channel when the target channel is included in a currently receiving transform stream, and changing a channel into a first stored channel, which is determined on the predetermined priority among plural virtual channels, among the stored channels when the target channel is not included in the currently receiving transform stream.

According to another aspect of the present invention, the DCC information is tabulated as a DCCT.

The foregoing and/or other aspects of the present invention can achieved by providing a digital broadcast receiver having a DCC function, comprising a broadcasting receiver to receive a broadcasting signal from a broadcasting station; a tuner to tune a predetermined channel on the basis of a predetermined control signal; a memory to store the tuned channels; a parsing unit to parse DCC information included in the broadcasting signal; and a controller to check a target channel of the parsed DCC information through the memory, and change a channel based on the DCC information by selecting one among plural virtual channels according to a predetermined priority when the plural virtual channels correspond to the target channel.

According to another aspect of the present invention, the controller changes a channel into the target channel when the target channel is included in a currently receiving transform stream, and changes a channel into a first stored channel among the stored channels when the target channel is not included in the currently receiving transform stream.

BRIEF DESCRIPTION OF THE DRAWINGS

The above and/or other aspects and advantages of the present invention will become apparent and more readily

FIG. 2 shows an example of a DCCT; and

DETAILED DESCRIPTION OF EXEMPLARY EMBODIMENTS

Figure 1:
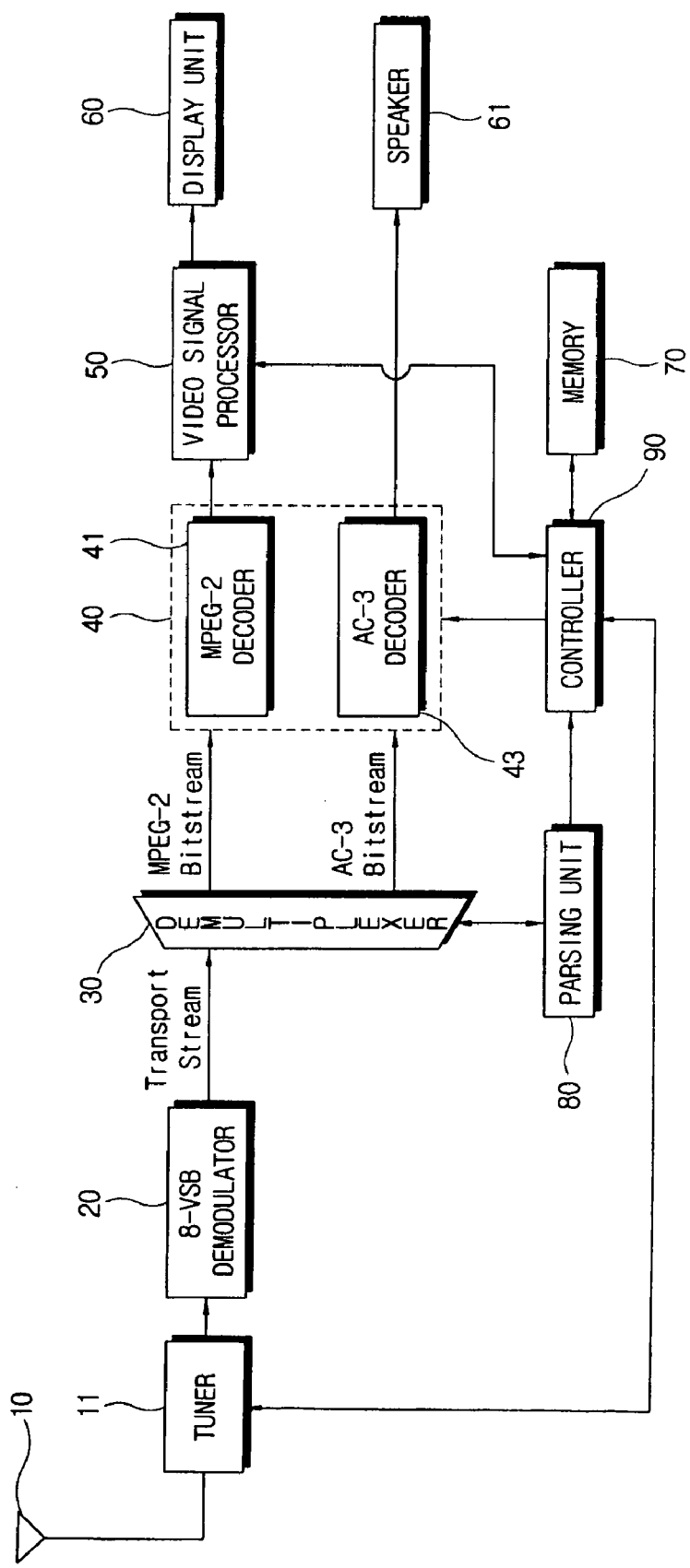
FIG. 1 is a control block diagram of a digital television according to an embodiment of the present invention.

Reference will now be made in detail to the exemplary embodiments of the present invention, examples of which are illustrated in the accompanying drawings, wherein like reference numerals refer to like elements throughout. The embodiments are described below in order to explain the present invention by referring to the figures.

FIG. 1 is a control block diagram of a digital television according to a first embodiment of the present invention. For reference, the digital television according to the first embodiment of the present invention receives a broadcasting signal based on the ATSC standard.

As shown in FIG. 1, the digital television according to an embodiment of the present invention includes an antenna 10, a tuner 11, a 8-vestigial sideband (VSB) demodulator 20, a demultiplexer 30, a decoder 40, a video signal processor 50, a display unit 60, a speaker 61, a memory 70, a parsing unit 80, and a controller 90.

A digital broadcasting signal is transmitted by time-division multiplexing and packeting a video signal, an audio signal and data information into a transport stream.

The tuner 11 tunes the broadcasting signal received through the antenna 10 to a broadcasting signal having a frequency band corresponding to a tuning control signal of the controller 90 (to be described later).

The broadcasting signal of a tuned certain channel is output as the transport stream through a VSB demodulating process, an error correcting process, or the like by the 8-VSB demodulator 20. Then, the broadcasting signal is divided into the video signal, the audio signal and various appendix data such as program and service information protocol (PSIP) information by the demultiplexer 30, and output as a bit stream.

The video data divided through the demultiplexer 30 is decoded by a moving picture experts group (MPEG)-2 decoder 41, and processed by the video signal processor 50, thereby being displayed on the display unit 60. Here, the display unit 60 employs various type display modules such as digital light processing (DLP), a liquid crystal display (LCD), a plasma display panel (PDP), etc. Further, the signal processor 50 includes a scaler for converting the video signal to have a vertical frequency, a resolution, an aspect ratio, etc. proper to output standards of the display unit 60.

Further, the audio signal is decoded by an audio coding (AC)-3 decoder 43, and output to the speaker 61.

Also, information about the tuned channel is stored in the memory 70. The information about the channel stored in the memory 70 can be used when a target channel is checked on a DCC function (to be described later).

Meanwhile, various appendix data included in the PSIP information divided by the demultiplexer 30 is stored in a predetermined memory (not shown) by the controller 90 according to data tables. Among the appendix data, data for displaying an image is processed through the video signal processor 50, synthesized with a currently tuned video signal, and output to the display unit 60 according to controls of the controller 90.

Here, the PSIP information basically includes a system time table (STT), a master guide table (MGT), a virtual channel table (VCT), a rating region table (RRT), an event information table (EIT), and an ETT (extended text table). Further, the PSIP information includes a DCCT.

Below, an example of the DCCT will be described with reference to FIG. 2.

As shown in FIG. 2, the DCCT includes postal code information, local information, population information, and genre information. Further, the local situation information includes a country code, a regional code, and a detailed regional code. Also, the population information includes information about sex, age, occupation, etc.

Such DCC information can be variously defined according to dcc_selection_types. For example, in the case of the postal code, the dcc_selection_type includes 0x01, 0x02, 0x11 and 0x12. In this case, a dcc_selection_id is a postal code value, and operates according to types. Besides, the dcc_selection_type related to the DCCT includes the local information (0x0C, 0x1C), the population information (0x05, 0x06, 0x5, 0x16), and the genre information (0x07, 0x08, 0x17, 0x18).

Such a received DCCT is parsed by the parsing unit 80 and stored in a predetermined memory (not shown). Here, the parsing unit 80 can be realized by a software program, and embedded in a controller chip such as a microcomputer or the like.

While performing the DCC function according to the parsed DCC information, the controller 90 controls a channel to be changed according to predetermined priority when two or more virtual channels correspond to a target channel. Here, the controller 90 can be achieved by the microcomputer or the like.

Referring to FIG. 2, in the case that a user currently watches a virtual channel corresponding to dcc_from_major_channel_number and dcc_from_minor_channel_number, when a value set by a user is identical with the dcc_selection_id of each dcc_selection_type (i.e., evaluation true), the controller 90 controls the current channel to move to a virtual channel corresponding to the dcc_to_major_channel_number and the dcc_to_minor_channel_number at dcc_start_time, and controls the virtual channel to return to the original channel at dcc_end_time.

Here, the value set by a user means user information corresponding to the DCCT previously input by a user through a predetermined user selection unit (not shown). For example, the value set by a user is information corresponding to the postal code information, the local information, the population information, and the genre information. Here, the local situation information includes a country code, a regional code, and a detailed regional code. Also, the population information includes information about sexes, ages, occupations, etc. Thus, the controller 90 controls the channel to move to a corresponding target channel when the DCC information parsed by the parsing unit 80 is identical with the user information.

Meanwhile, the controller 90 selects a channel according to predetermined priority and performs the DCC function when two or more virtual channels correspond to a target channel, i.e., the dcc_to_major_channel_number and the dcc_to_minor_channel_number.

Here, the priority can be set variously. For example, the controller 90 changes a current channel into a target channel according to the DCC function when the target channel is included in a currently receiving transform stream. On the other hand, the controller 90 changes a current channel in order of a channel previously stored in the memory, in order of low frequency, and in order of high frequency when the target channel is not included in the currently receiving transform stream.

Here, the currently receiving transform stream means a transform stream having the same frequency band as a currently watching channel. That is, among the virtual channels included in a physical transmission channel (PTC), the one most similar to the target channel has the priority.

Thus, to perform the DCC function, a plurality of channels duplicates as the target channel, one channel is selected and changed according to predetermined priority.

Figure 3:
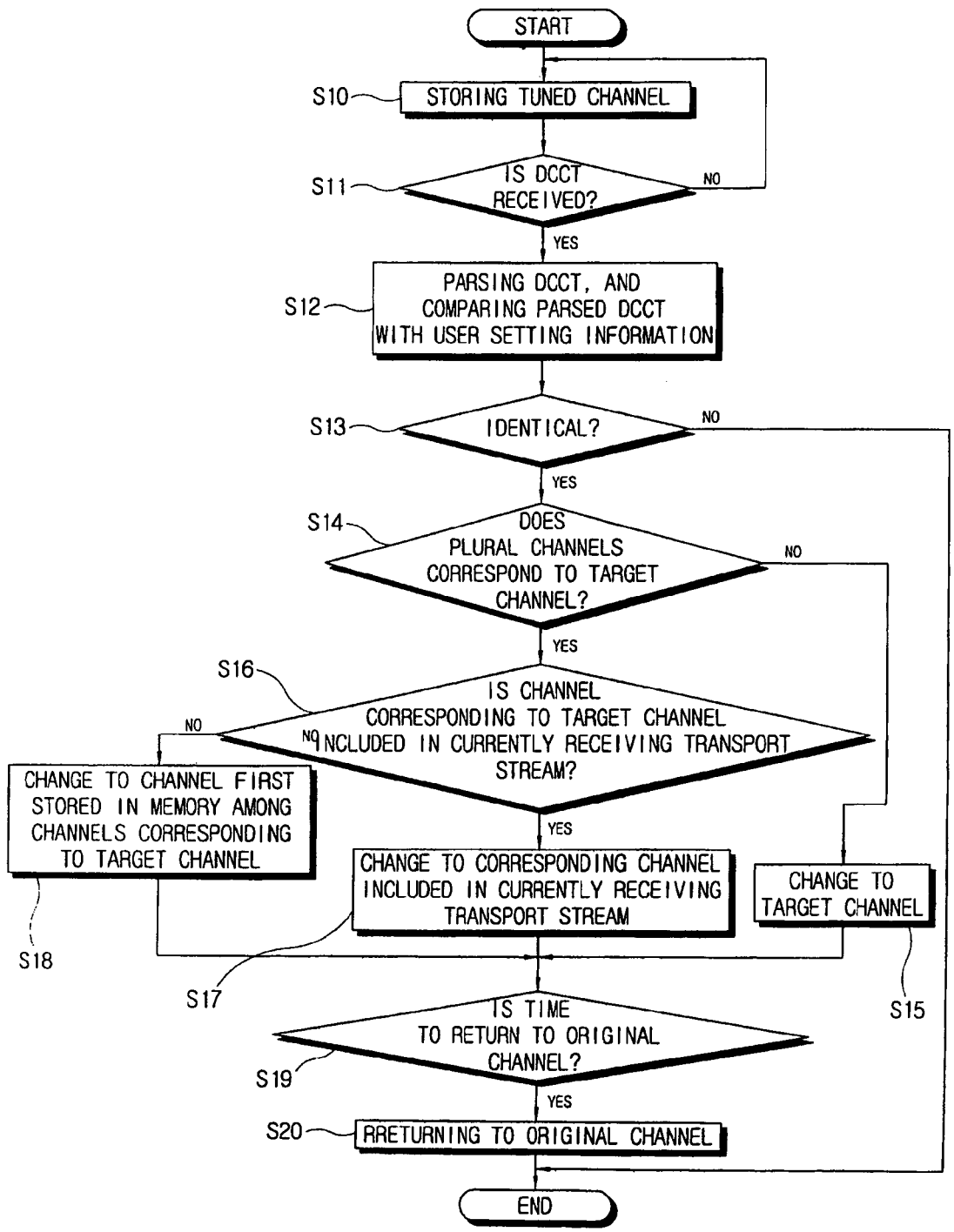
FIG. 3 is a control flowchart of the digital television according to an embodiment of the present invention.

Below, a control flow of the digital television according to an embodiment of the present invention will be described with reference to FIG. 3.

At operation S10, when a user selects a desired channel through the user selection unit, the controller 90 tunes the tuner 20 to the corresponding channel, and stores information about the tuned channel in the memory 70.

At step S11, it is determined whether the DCCT is received. When the DCCT is received through a signal receiver, at operation S12 the parsing unit 70 parses the DCC information. At operation S12 and S13, the controller 90 compares the parsed DCC information with the user information about the preset DCC function. When the parsed DCC information is identical with the user information, at operation S14 the controller 90 checks the target channel, and determines whether the one or more virtual channels correspond to the target channel.

When one virtual channel corresponds to the target channel, at operation S15 the controller 90 controls the channel to be changed into a corresponding channel at a corresponding time based on the dcc_start_time.

On the other hand, when plural virtual channels correspond to the target channel, at operation S16 the controller 90 determines whether a virtual channel corresponding to the target channel is included in the currently receiving transform stream.

For example, when the dcc_to_major_channel_number and the dcc_to_minor_channel_number correspond to '11-1' as the target channel of the DCC information, and the virtual channel corresponding to '11-1' duplicates between Seoul and Daejeon, the controller 90 determines whether the corresponding virtual channel is included in the currently receiving transform stream.

In the case where the channel of '11-1' corresponding to Seoul is included as the target channel in the currently receiving transform stream, at operation S17 the controller 90 controls the channel to move to the corresponding virtual channel at the dcc-start_time.

On the other hand, in the case where the channel of '11-1' is not included as the target channel in the currently receiving transform stream, at operation S18 the controller 90 controls the channel to move to a channel first stored in the memory 70 among the channels of '11-1' corresponding to Seoul and Daejeon.

Alternatively, the channel priority of the controller 90 may be varied. For example, the controller 90 may be tuned to a low frequency channel with first priority. Further, the controller 90 may be tuned to a high frequency channel with first priority.

At operation S19, the controller 90 determines the DCC returning time. At the DCC returning time, at operation S20 the controller 90 returns the changed channel to the channel into the original channel.

Here, a dcc mode is stopped when a user selects another channel before returning to the original channel or when a table (dcc_selection_type=0x0F) for stopping the dcc mode is received.

In the foregoing embodiment, the DCCT is based on the ATSC standard, but not limited to. Alternatively, the present invention can be applied to other broadcasting standards. Further, the priority of the channel change may be varied.

As described above, the present invention provides a digital broadcast receiver and a directed channel change method thereof, in which one of duplicated channels is automatically selected on a DCC function when a target channel duplicates.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A directed channel change method for a digital broadcast receiver on the basis of directed channel change (DCC) information, the method comprising:
    receiving the DCC information from a broadcasting station;
    parsing the DCC information;
    checking a target channel included in the DCC information; and
    changing a channel by selecting one among plural virtual channels according to predetermined priority when the plural virtual channels correspond to the target channel.

2. The method according to claim 1, wherein the changing the channel comprises determining whether the target channel is included in a currently received transform stream, and changing the channel into a target channel included in the currently received transform stream when the target channel is included in the currently receiving transform stream.

3. The method according to claim 2, wherein the changing the channel comprises changing the channel according to predetermined priority when the plural virtual channels corresponding to the target channel are not included in the currently received transform stream.

4. The method according to claim 3, wherein the DCC information is tabulated as a direct channel change table (DCCT).

5. The method according to claim 2, wherein the DCC information is tabulated as a direct channel change table (DCCT).

6. The method according to claim 1, wherein the DCC information is tabulated as a direct channel change table (DCCT).

7. A directed channel change method for a digital broadcast receiver on the basis of DCC information, the method comprising:
    storing tuned channels;
    receiving the DCC information from a broadcasting station;
    parsing the DCC information;
    checking a target channel included in the DCC information; and
    changing a channel into the target channel when the target channel is included in a currently received transform stream, and changing a channel into a first stored channel determined upon a predetermined priority among the stored channels when the target channel is not included in the currently received transform stream.

8. The method according to claim 7, wherein the DCC information is tabulated as a DCCT.

9. A digital broadcast receiver having a DCC function, comprising:
- a broadcasting receiver to receive a broadcasting signal from a broadcasting station;
- a tuner to tune a predetermined channel on the basis of a predetermined control signal;
- a memory to store the tuned channel;
- a parsing unit to parse DCC information included in the broadcasting signal; and
- a controller to check a target channel of the parsed DCC information through the memory, and change a channel based on the DCC information by selecting one among plural virtual channels according to predetermined priority when plural virtual channels correspond to the target channel.

10. The digital broadcast receiver according to claim 9, wherein the controller changes a channel into the target channel when the target channel is included in a currently receiving transform stream, and changes a channel into a first stored channel determined upon a predetermined priority among the stored channels in the memory when the target channel is not included in the currently receiving transform stream.

* * * * *